(12) United States Patent
Meisberger

(10) Patent No.: US 6,440,055 B1
(45) Date of Patent: Aug. 27, 2002

(54) MAGNETIC GEAR AND CENTRIFUGE HAVING A MAGNETIC GEAR

(75) Inventor: Artur Meisberger, Wendel (DE)

(73) Assignee: Fresenius Hemocare GmbH, Bad Homburg (DE)

( * ) Notice: Subject to any disclaimer, the term of this patent is extended or adjusted under 35 U.S.C. 154(b) by 0 days.

(21) Appl. No.: 09/664,189

(22) Filed: Sep. 18, 2000

(30) Foreign Application Priority Data

Sep. 17, 1999 (DE) ......................................... 199 44 617

(51) Int. Cl.[7] .................................................. B04B 9/00
(52) U.S. Cl. .......................................... 494/84; 310/103
(58) Field of Search .............................. 494/43, 45, 84; 310/103–105; 464/29; 366/273–274; 416/3; 417/420

(56) References Cited

U.S. PATENT DOCUMENTS

| | | | | |
|---|---|---|---|---|
| 2,460,015 A | * | 1/1949 | Jones |
| 3,113,228 A | * | 12/1963 | Tolegian |
| 3,304,990 A | * | 2/1967 | Ontko et al. |
| 3,645,650 A | | 2/1972 | Laing |
| 3,762,839 A | | 10/1973 | Laing |
| 3,796,898 A | * | 3/1974 | Kleinwaechter |
| 4,129,249 A | * | 12/1978 | Todd |
| 4,226,669 A | * | 10/1980 | Vilardi |
| 4,285,463 A | * | 8/1981 | Intengan |
| 4,341,343 A | * | 7/1982 | Beckman |
| 4,776,832 A | * | 10/1988 | Martin et al. |
| 5,030,361 A | | 7/1991 | Ishida et al. |
| 5,227,066 A | | 7/1993 | Ishida et al. |
| 5,683,341 A | * | 11/1997 | Giebeler |
| 6,095,677 A | * | 8/2000 | Karkos, Jr. et al. |
| 6,280,375 B1 | * | 8/2001 | Meisberger et al. |

FOREIGN PATENT DOCUMENTS

| | | | |
|---|---|---|---|
| DE | AS 1 021 461 | | 12/1957 |
| DE | CH 436 486 | | 11/1967 |
| DE | OS 2 005 803 | | 1/1971 |
| DE | A 32 42 541 | | 5/1984 |
| DE | 4008945 | * | 9/1990 |
| DE | 42 23 815 | | 1/1994 |
| DE | 689 16 911 | | 11/1994 |
| DE | 195 43 106 | | 5/1997 |
| DE | 198 01 767 | | 10/1999 |
| EP | 0 669 700 | | 8/1995 |
| EP | 849 869 | | 6/1998 |
| EP | 0 930 099 | | 7/1999 |
| EP | 0 954 087 | | 11/1999 |
| WO | 96/04996 | * | 2/1996 |
| WO | WO 96/40322 | | 12/1996 |

OTHER PUBLICATIONS

Weinmann, "Recoma–Standardkupplungen" CH–Z Technische Rundschau, Dec., 1980.

* cited by examiner

*Primary Examiner*—Charles E. Cooley
(74) *Attorney, Agent, or Firm*—Kenyon & Kenyon

(57) ABSTRACT

A magnetic gear having first and second carrier each having a plurality of magnetic poles arranged in a circle and separated by a distance, with the north and south poles arranged in alternation. Flux-carrying connecting pieces are provided on a third carrier to magnetically couple the first and second carriers. A centrifuge for centrifuging biological fluids, especially blood, having such a magnetic gear includes a first carrier in a stationary mount on a frame, while the third carrier is a rotating frame in a rotating mount on the frame. The second carrier is a separation unit mounted on the rotating frame. The centrifuge using the magnetic gear allows maintenance-free operation at a high rpm and with low noise, requiring a relatively low driving power.

15 Claims, 4 Drawing Sheets

MAGNETIC GEAR AND CENTRIFUGE HAVING A MAGNETIC GEAR

FIELD OF THE INVENTION

The present invention relates to a magnetic gear and a centrifuge having a magnetic gear, in particular a flow-through centrifuge without axial face seals used for centrifuging biological fluids such as blood.

BACKGROUND OF THE INVENTION

In a conventional flow-through centrifuge, blood which is to be separated into its different components flows through an inlet line into a rotating centrifuge chamber, and the separated components are removed from the centrifuge chamber through outlet lines. Management of the inlet and outlet lines can be difficult, because of the relative movement of the centrifuge chamber and the stationary connection of the lines. Traditional flow-through centrifuges use rotating joints to prevent the lines from twisting.

German Patent Application DE-A 32 43 541 describes a centrifuge without axial face seals, where the inlet and outlet lines are carried in a loop around the centrifuge chamber at half the Revolutions Per Minute (rpm) of the centrifuge chamber. To do so, the lines are connected to a rotating frame which rotates at half the rpm of the centrifuge chamber. The rotating frame is connected to a hollow shaft, the drive for the centrifuge chamber being provided with a drive shaft extending through the hollow shaft. A belt drive is used to transfer the torque to the hollow shaft and the drive shaft.

International Patent WO 96/40322 describes a centrifuge characterized by a very compact design. The centrifuge chamber and the line-entraining mechanism are driven at half the rpm and in the same direction of rotation as the chamber by means of a toothed gear. However, the relatively high operating noise of the gear wheels is a disadvantage of this design. Furthermore, the use of gear wheels requires high precision manufacturing of the centrifuge, which is thus complicated and expensive. In addition, the gears must be lubricated, which not only increases maintenance but also leads to a collection of dirt and soiling. Moreover, the gears are subject to constant wear.

Magnetic gears are known for transmission of torque. European Patent EP 849,869 A2 describes a gear having several parts that move relative to one another and work together magnetically, one part being provided for a connection to a drive shaft and one as a stationary part. The individual parts are designed as ring-shaped bodies arranged concentrically.

SUMMARY OF THE INVENTION

The present invention is a very compact magnetic apparatus for a centrifuge, in particular for a flow-through centrifuge without axial face seals, which permits largely maintenance-free operation of the centrifuge at a high rpm with low noise and with relatively low driving power.

In one embodiment, the invention is a magnetic gear magnetically connecting a plurality of carriers rotatable relatively to one another. The invention includes a first and a second carrier, a plurality of magnetic poles disposed in a circle on each of the first and second carrier, with a gap separating adjacent magnetic poles, the plurality of magnetic poles being arranged in an alternating positive pole and negative pole configuration, and a third carrier. The third carrier has at least two pairs of flux-carrying connecting pieces, wherein said flux-carrying connecting pieces are arranged so that, in a first rotational position of the carriers, a first section of the first pair of flux-carrying connecting pieces faces the gap between two adjacent magnetic poles of the first carrier, and a second section of the first pair of flux-carrying connecting pieces faces the gap between two adjacent magnetic poles of the second carrier. Additionally, in the first rotational position of the carriers, a first section of the second pair of flux-carrying connecting pieces faces a magnetic pole of the first carrier, and a second section of the second pair of flux-carrying connecting pieces faces a magnetic pole of the second carrier.

The magnetic gear has a first and second carrier, each having a plurality of magnetic poles arranged on a circle with spacing gap between them, and with the north and south poles alternating. The magnetic coupling of the first and second carriers is accomplished by a third carrier which includes the flux-carrying connecting pieces.

To transmit a torque from a drive shaft to a driven shaft, one of the carriers is stationary while the other two carriers are connected to the drive shaft and the driven shaft. When one of the two rotating carriers is driven at a certain rpm, the other rotating carrier rotates at a certain rpm in the same direction or in the opposite direction, with the direction of rotation and the rpm depending on the configuration of the magnetic poles and the connecting pieces.

To magnetically couple the first and second carrier, the third carrier has at least two pairs of flux-carrying connecting pieces. These pieces are arranged so that, in a starting position, a first section of the first pair of flux-carrying connecting pieces is facing a gap between two adjacent magnetic poles of the first carrier, and a second section of the first pair is facing a gap between two adjacent magnetic poles of the second carrier.

At the same time, a first section of the second pair of flux-carrying connecting pieces is facing a pole of a magnet of the first carrier, and a second section of the second pair is facing a pole of a magnet of the second carrier. If the carriers are rotated relative to one another, the starting condition as described above is again established, where the one pair of flux-carrying connecting pieces is facing a gap and the other pair is facing a magnetic pole. In these starting positions, the magnets generate a magnetic flux which is closed over the flux-carrying connecting pieces.

In one embodiment, the first and second carriers can be parallel disks on whose facing sides magnets are arranged. However, the magnets can also be arranged on the periphery of the disks. The configuration can be changed as long as the magnetic poles are arranged on a circle at a distance from one another, with the north and south poles alternating and the magnetic flux being closed over the connecting pieces. The first and second carriers preferably have the same diameter, so that the magnets are directly opposite one another. However, the carriers may also have different diameters and/or a different number of magnetic poles, so that one row of magnets is offset relative to the other row of magnets.

In another embodiment, the magnetic poles can be arranged at uniform distances on the first and second carriers, with the distance between the magnetic poles preferably being equal to the width of the magnets. The width of the flux-carrying connecting pieces preferably corresponds to the distance between the magnets. The geared drive and the driven carriers are then engaged especially rigidly, and torque can be transmitted smoothly.

To close the magnetic flux over the first and second carriers, the two carriers can each be preferably made of a soft magnetic material. However, the carriers need not be made completely of soft magnetic material. Only the parts of the carrier between the magnets can be made of a soft magnetic material, and still be sufficient to close the magnetic flux.

The flux-carrying connecting pieces may consist of either one or two flux-carrying elements arranged with a distance between them. When two flux-carrying elements are provided for each connecting piece, it is possible to prevent the magnetic flux generated by the magnets of a carrier from being closed directly over the connecting piece. To reduce eddy current losses, the connecting elements of the connecting piece may in turn be made of a plurality of sheets of magnetic sheet steel insulated from one another.

The flux-carrying connecting pieces may be shaped in various ways. An important parameter is that the first and second sections of the flux-carrying connecting pieces must extend between the opposite magnets of the two carriers, forming a narrow air gap. The first and second sections of the flux-carrying connecting pieces can preferably have their end sections arranged close to the magnets. However, the connecting pieces may also extend beyond the magnets on both sides.

When applying the magnetic coupling according to the invention to a centrifuge for separating fluids, in one exemplary embodiment the first carrier can be arranged in a stationary mount on a frame. The third carrier can be a rotating element arranged rotatably on a frame, while the second carrier can be a separation unit arranged on the rotating frame. For rotating the separation unit, the rotating frame is driven. To do so, the rotating frame may be connected to a drive shaft extending, for example, through the stationary carrier. However, other types of drives are also possible.

A centrifuge utilizing a magnetic drive gear is characterized by a very compact design. It can be operated largely maintenance-free at a high rpm with a relatively low driving power and a low noise level.

The magnetic gear can be designed so that the separation unit rotates at twice the rpm of the rotating frame. This can be accomplished using two parallel disks, preferably having the same diameter as the carriers, on which the same number of magnetic poles are arranged at equal intervals. Although the ratio of the magnetic poles on the carriers reflects the ratio of rpm's. the position of the flux-carrying connecting pieces determines the direction of rotation.

The line for supplying and for removing at least one fluid can preferably be carried from a stationary connection around the separation unit, and can be connected to the separation unit on a side of the line facing away from the stationary connection point. Twisting of the separation unit is prevented if the separation unit rotates at twice the rpm of the rotating frame.

Other objects, features and advantages of the invention will be readily apparent from the following detailed description of a preferred embodiment thereof taken in conjunction with the drawings.

BRIEF DESCRIPTION OF THE DRAWINGS

Several embodiments of the magnetic gear according to the invention and of a centrifuge utilizing the magnetic gear are described in greater detail below, with reference to the drawings.

DETAILED DESCRIPTION OF THE PREFERRED EMBODIMENTS

Figure 1:
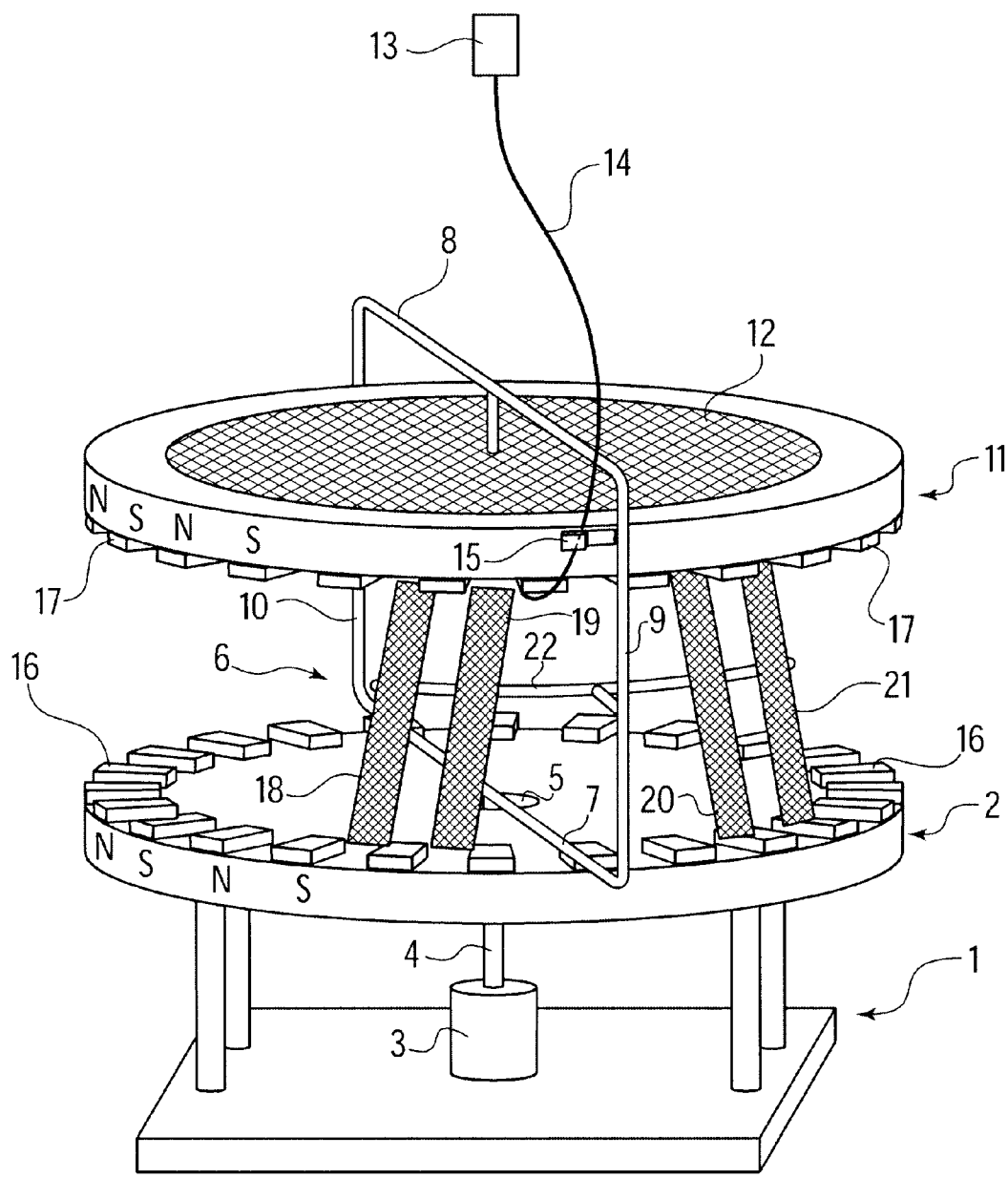
FIG. 1 is a perspective view of a simplified schematic diagram of a centrifuge having a magnetic gear.

FIG. 1 shows a centrifuge without axial face seals for centrifuging biological fluids, specifically blood, depicted in a greatly simplified schematic diagram. The centrifuge has a frame 1 on which a first carrier 2 is arranged on a stationary mount in the form of a circular disk having diameter D. An electric motor drive 3 is arranged on frame 1 beneath the first carrier, its drive shaft 4 extending upward through a recess 5 in first carrier 2. Electric motor drive 3 is used to drive a rectangular rotating frame 6 which consists of two horizontal elements 7, 8 and two vertical elements 9, 10.

Lower horizontal element 7 of rotating frame 6 is connected to drive shaft 4 of electric motor drive 3, while a second carrier 11, also in the form of a circular disk, is mounted so it can rotate about the axis of rotation of rotating frame 6, on upper element 8 of rotating frame 6. First and second carriers 2, 11 are aligned parallel to one another and have the same diameter D.

Second carrier 11 is part of a separation unit. For example, a traditional centrifuge chamber 12 can be integrated into the second carrier 11. However, the centrifuge chamber may also be arranged above or below the second carrier 11.

A flexible line 14 can combine one or more flexible tubes for carrying and removing the blood or blood components into or out of separation unit 12 . Flexible line 14 can be guided from a stationary connection 13 around the centrifuge chamber, and can be connected to the separation unit at the bottom side of second carrier 11. A line support 15 is mounted on vertical element 9 of rotating frame 6, with line 14 connected to it. However, the line may also be carried loosely without being connected to the rotating frame.

First and second carriers 2, 11 support on their facing surfaces a plurality of magnetic poles 16, 17 which are arranged on a circle at a distance from one another, with the north and south poles alternating. The magnetic coupling of first and second carriers 2, 11 is provided by flux-carrying connecting pieces 18, 19, 20, 21 which are mounted on rotating frame 6. A side support 22 is mounted on vertical element 9 of the rotating frame. The magnetic coupling of the first and the second carrier to the flux-carrying connecting pieces will be described in greater detail with reference to FIGS. 2a through 2c.

The drive of separation unit 12 and rotating frame 6 operates as follows. Electric motor drive 3 drives rotating frame 6 together with flux-carrying connecting pieces 18, 19, 20, 21 at an rpm n. Second carrier 11, which is magnetically engaged with first carrier 2 by way of the flux-carrying connecting pieces 18, 19, 20, 21, rotates in the same direction of rotation as the rotating frame but at twice the rpm, or 2n. This prevents twisting of line 14.

Figure 2A:
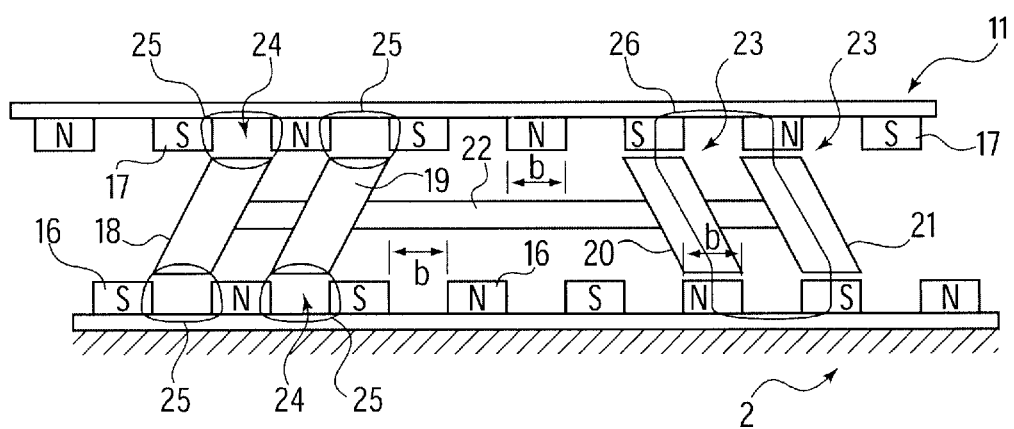
FIGS. 2a through 2c are diagrams showing the functioning of the magnetic gear of the centrifuge shown in FIG. 1.
Figure 2B:
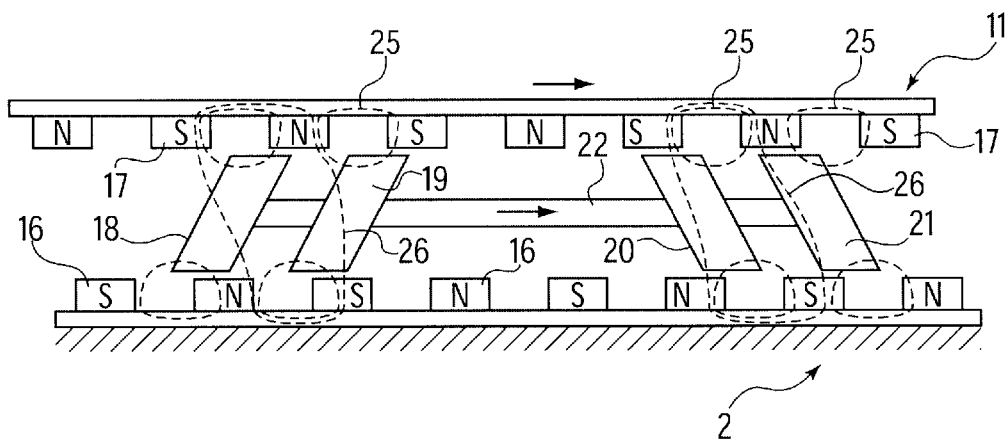
Figure 2C:
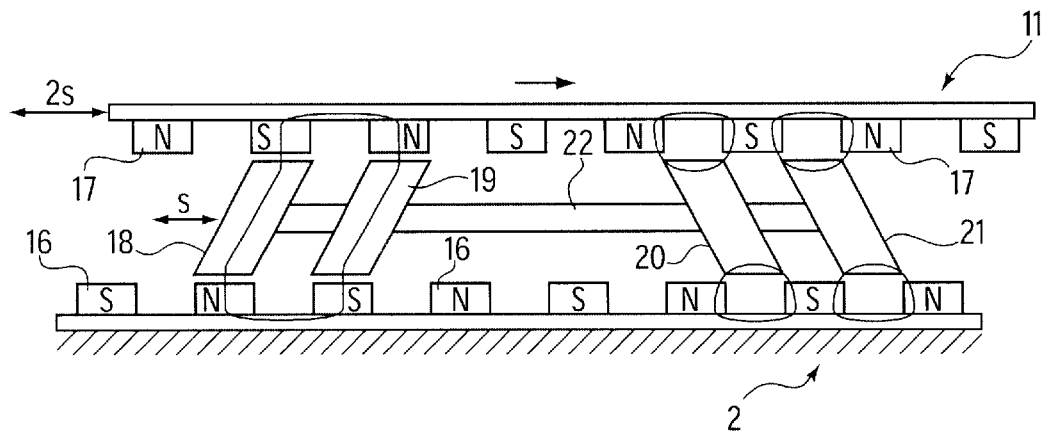

FIGS. 2a through 2c illustrate the operating principles of the magnetic gear. The two carriers can be each made of soft magnetic material. First carrier 2 is stationary while second carrier 11 is rotatably mounted. Individual magnets 16, 17 are arranged on carriers 11 with a uniform spacing and with alternating north and south poles. In this exemplary embodiment, width b of the magnetic poles corresponds to width b of the gaps between the adjacent magnets.

For magnetic coupling of the two carriers, two pairs of flux-carrying connecting pieces 18, 19 and 20, 21, made of soft magnetic material are provided. The disk-shaped connecting pieces can have the same width b as magnets 16, 17. The first two connecting pieces 18, 19 are aligned parallel to one another and are attached to side support 22 of rotating frame 6 side by side, at an inclination to the axis of rotation of rotating frame 6. The two other connecting pieces 20, 21 are also aligned parallel to one another and are attached to the support of the rotating frame at an inclination to the axis of rotation of the rotating frame. Connecting pieces 18, 19 are inclined in the opposite direction from connecting pieces 20, 21. All the connecting pieces extend between the opposing magnets, so there remains only a narrow air gap 23 between the connecting pieces and the magnets. In the exemplary embodiment, the lateral clearance between the connecting pieces of a pair corresponds to twice the width, or 2b, of the magnets.

FIG. 2a shows a starting state, which has been selected to facilitate understanding of the invention, in which the ends of two left connecting pieces 18, 19 are each facing a gap 24 between two carriers 2, 11, while two right connecting piece 20, 21 are each facing a magnet 16, 17 of the carriers. The magnetic flux generated by the magnets is closed directly over the ends of connecting pieces 18, 19 when the latter are facing the gaps. These magnetic circuits are labeled by reference number 25. In the case of connecting pieces 20, 21 facing the magnets, the magnetic flux is closed over the connecting pieces. This magnetic circuit is labeled as 26.

FIG. 2b shows the arrangement of FIG. 2a after rotating frame 6 is rotated so that the ends of left connecting pieces 18, 19 partially overlap with adjacent magnets 16, 17, and the ends of the right connecting pieces 20, 21 are advanced over gaps 24 between the magnets. In this in-between position, a magnetic circuit that is closed over connecting pieces 18, 19 is formed on the left side. Magnetic circuits 25, 26 which are closed over the ends of connecting pieces 20, 21, are formed on the right side. However, the magnetic flux is relatively weak in this configuration. Therefore, these magnetic circuits are shown with dotted lines. In this intermediate position, second carrier 11 is not yet following the rotational movement of frame 6.

When rotating frame 6 is rotated further, so that left connecting pieces 18, 19 are near magnets 16, 17 and right connecting pieces 20, 21 are near gaps 24 of first carrier 2, second carrier 11 is entrained by the first carrier because of the magnetic coupling effect. Second carrier 11 again assumes a position in which the left connecting pieces are facing its magnets and the right connecting pieces are facing its gaps. Then the magnetic flux is closed on the left side over the connecting pieces, while the magnetic flux on the right side is closed directly over the ends of the connecting pieces. With a continuous rotational movement of the rotating frame at rpm n, the second carrier rotates with rpm 2n in the same direction.

FIGS. 3a through 3d show the operating principles of another embodiment of the magnetic gear. The magnetic gear according to FIGS. 3a through 3d differs from the gear described with reference to FIGS. 2a through 2c by the fact that the connecting pieces each consist of two sheet-shaped connecting elements 18', 18"; 19', 19"; 20', 20"; 21', 21" aligned parallel to one another. The distance between the two connecting elements of each connecting piece corresponds to width b of the magnets and of the gaps. The elements shown in FIGS. 3a through 3d which correspond to those of FIGS. 2a through 2c are labeled with the same reference numbers.

Figure 3A:
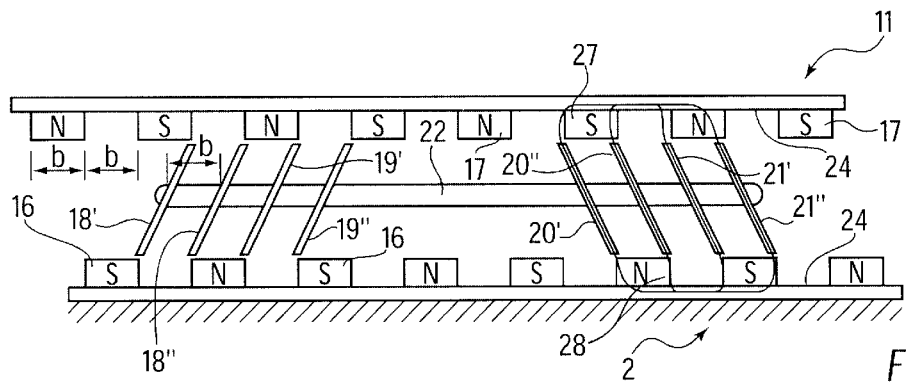
FIGS. 3a through 3d are diagrams showing the functioning of another embodiment of the magnetic gear of the centrifuge shown in FIG. 1.

In the embodiment according to FIGS. 3a through 3d, the second carrier rotates at twice the rpm of the rotating frame, in the same direction of rotation. FIG. 3a shows the stable starting position in which the magnetic flux is closed over connecting elements 20', 20"; 21', 21" which are facing the magnets. These magnetic circuits are labeled with numbers 27 and 28. However, the magnetic flux cannot be closed over the ends of connecting elements 18', 18"; 19', 19" facing the gaps.

Figure 3B:
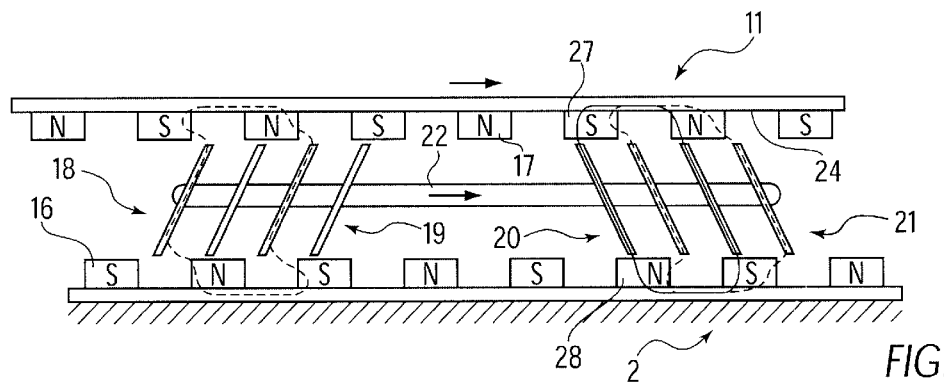
Figure 3C:
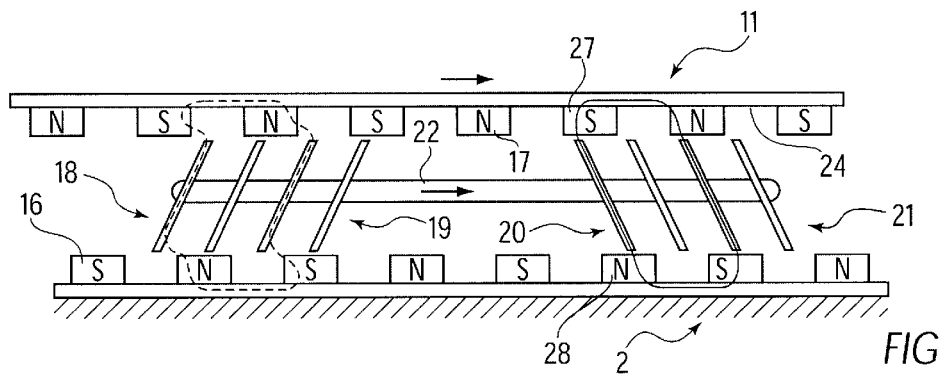

When rotating frame 6 is rotated, the intermediate states illustrated in FIGS. 3b and 3c are established first, where the magnetic flux is closed over the connecting elements. The strong magnetic field lines are drawn with solid lines and the weak magnetic field lines are drawn with dotted lines. However, second carrier 11 is still not entrained in this condition.

Figure 3D:
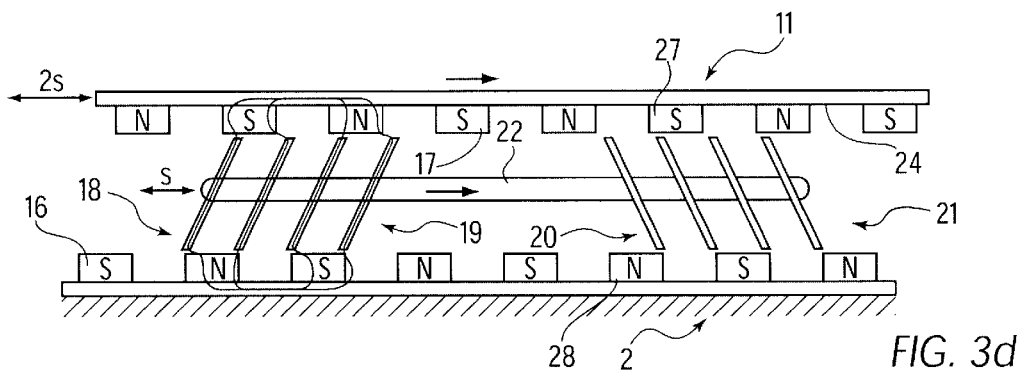

When left connecting elements 18, 19 are facing magnets 16, 17 and right connecting elements 20, 21 are facing gaps 24 of first carrier 2, the starting state is established again (FIG. 3d). Second carrier 11 follows the rotational movement of rotating frame 6 until its magnets 17 are above left connecting elements 18, 19 and its gaps 24 are above right connecting elements 20, 21. The magnetic flux is then closed on the left side. In the case of such an arrangement of the connecting elements, a uniform operation is achieved.

Figure 4:
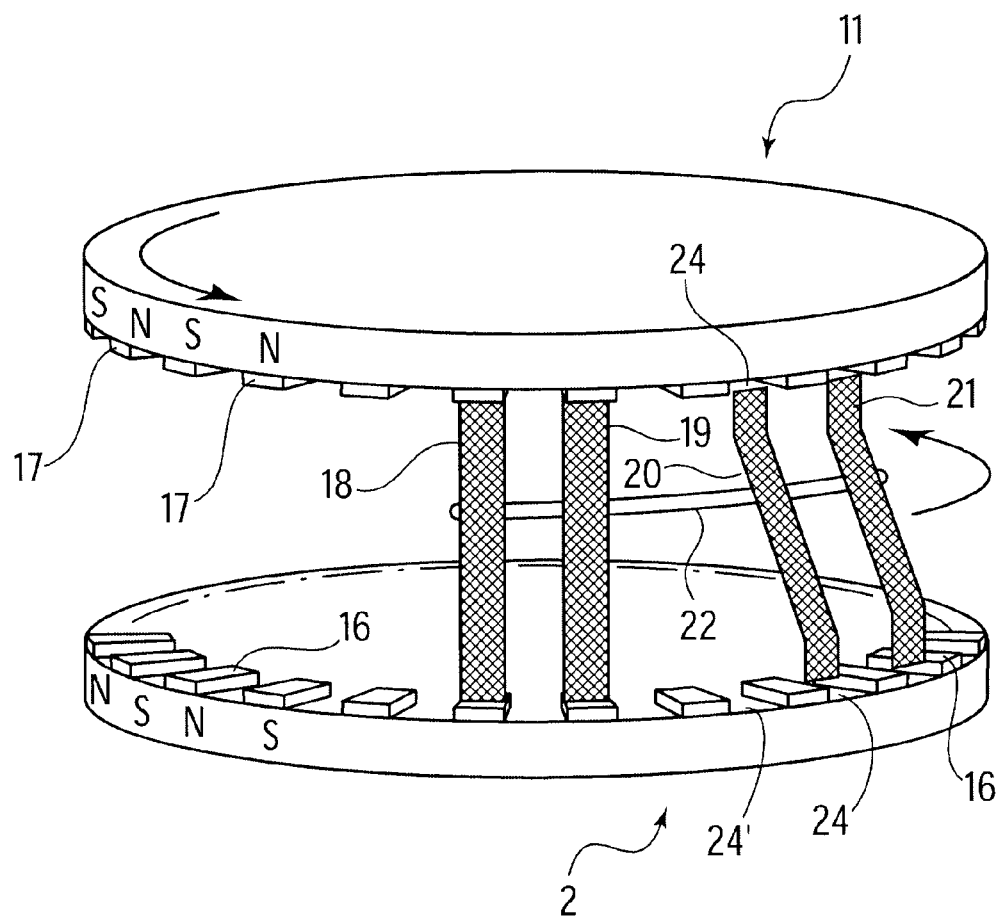
FIG. 4 is a perspective view of an alternative embodiment of the magnetic gear having magnetic wheels rotating in opposite direction.

FIG. 4 shows a simplified schematic diagram of first and second carriers 2, 11 together with flux-carrying connecting pieces 18, 19, 20, 21 of a magnetic gear. The second carrier rotates at twice the rpm of the rotating frame (not shown), but in the opposite direction of rotation. The opposite direction of rotation of this embodiment results from the fact that one of the two pairs of connecting pieces 20, 21 does not extend from a gap 24 or from a magnet of one carrier 11 to gap 24' or to the magnet of the other carrier 2, which is directly opposite to gap 24 or to the magnet of the one carrier 11. Instead, the one of the connecting pieces 20, 21 extends to a gap 24 or to an offset magnet which is offset to it by one magnetic pole.

The present invention may be embodied in other forms without departing from the spirit or essential attributes thereof and accordingly reference should be made to the claims rather than to the foregoing specification as indicating the scope thereof.

What is claimed is:

1. A magnetic gear magnetically connecting a plurality of carriers rotatable relative to one another, comprising;

a first carrier and a second carrier;

a plurality of magnetic poles disposed in a circle on each of the first carrier and the second carrier, with a gap separating adjacent magnetic poles, the plurality of magnetic poles being arranged in an alternating positive pole and negative pole configuration; and a third carrier having at least two pairs of flux-carrying connecting pieces, wherein said flux-carrying connecting pieces are arranged so that, in a first rotational position of the carriers, a first section of the first pair of flux-carrying connecting pieces faces the gap between two adjacent magnetic poles of the first carrier, and a second section of the first pair of flux-carrying connecting pieces faces the gap between two adjacent magnetic poles of the second carrier, and wherein, in the first rotational position of the carriers, a first section of the second pair of flux-carrying connecting pieces faces a magnetic pole of the first carrier, and a second section of the second pair of flux-carrying connecting pieces faces a magnetic pole of the second carrier.

2. The magnetic gear according to claim 1, wherein the first carrier and the second carrier are two parallel disks having magnets arranged on facing sides of the two parallel disks.

3. The magnetic gear according to claim 2, wherein the first carrier and the second carrier have substantially equal diameters.

4. The magnetic gear according to claim 2, wherein the magnets are disposed at a uniform distance from one another on the first carrier and the second carrier.

5. The magnetic gear according to claim 2, wherein the gap separating the magnets of the first carrier and the second carrier has a size equal to a width of the magnets.

6. The magnetic gear according to claim 2, wherein the flux-carrying connecting pieces have a width equal to a width of the magnets.

7. The magnetic gear according to claim 2, wherein the first and second sections of the flux-carrying connecting pieces are end portions of the flux-carrying connecting pieces adjacent to one of the magnets and the gaps.

8. The magnetic gear according to claim 1, wherein the first carrier and the second carrier have an identical number of magnetic poles.

9. The magnetic gear according to claim 1, wherein the first carrier and the second carrier are made of a soft magnetic material.

10. The magnetic gear according to claim 1, wherein each of the flux-carrying connecting pieces comprises a yoke made of a soft magnetic material.

11. The magnetic gear according to claim 1, wherein each of the flux-carrying connecting pieces comprises two flux-carrying elements separated by a distance.

12. The magnetic gear according to claim 1, wherein the second carrier and the third carrier are rotatable, and the first carrier is stationary.

13. A centrifuge for separating fluids, comprising:
a magnetic gear;
a first carrier and a second carrier magnetically connected by the magnetic gear, the first carrier and the second carrier rotatable relative to each other;
a plurality of magnetic poles disposed in a circle on each of the first carrier and the second carrier, with a gap separating adjacent magnetic poles, the plurality of magnetic poles being arranged in an alternating positive pole and negative pole configuration; and
a third carrier magnetically connected by the magnetic gear and rotatable relatively to the first carrier and the second carrier, the third carrier having at least two pairs of flux-carrying connecting pieces, wherein said flux-carrying connecting pieces are arranged so that, in a first rotational position of the carriers, a first section of the first pair of flux-carrying connecting pieces faces the gap between two adjacent magnetic poles of the first carrier, and a second section of the first pair of flux-carrying connecting pieces faces the gap between two adjacent magnetic poles of the second carrier, and wherein, in the first rotational position of the carriers, a first section of the second pair of flux-carrying connecting pieces faces a magnetic pole of the first carrier, and a second section of the second pair of flux-carrying connecting pieces faces a magnetic pole of the second carrier.

14. The centrifuge according to claim 13, wherein the first carrier is disposed on a stationary mount of a frame, the third carrier is mounted on a rotating mount of the frame, and the second carrier is a separation unit disposed on the rotating mount.

15. The centrifuge according to claim 14, further comprising a line extending from a stationary connection around the separation unit to the separation unit, on a side of the separation unit facing away from the stationary connection, the line configured so that at least one fluid can flow therethrough.

* * * * *